(12) United States Patent
Shiino et al.

(10) Patent No.: US 6,234,572 B1
(45) Date of Patent: May 22, 2001

(54) SEAT FOR VEHICLES

(75) Inventors: Joutaro Shiino; Takahiro Nakamura, both of Hino (JP)

(73) Assignee: Hino Motors, Ltd., Hino (JP)

( * ) Notice: Subject to any disclaimer, the term of this patent is extended or adjusted under 35 U.S.C. 154(b) by 0 days.

(21) Appl. No.: 09/515,396

(22) Filed: Feb. 29, 2000

(30) Foreign Application Priority Data

Aug. 19, 1999 (JP) ................................................. 11-233088

(51) Int. Cl.⁷ ....................................................... A47C 31/00
(52) U.S. Cl. ......................................... 297/253; 297/463.1
(58) Field of Search ................................. 297/253, 250.1, 297/463.1

(56) References Cited

U.S. PATENT DOCUMENTS

| | | | |
|---|---|---|---|
| 5,918,934 | * | 7/1999 | Siegrist .............................. 297/253 X |
| 6,030,046 | * | 2/2000 | Dorow .............................. 297/253 X |

* cited by examiner

*Primary Examiner*—Anthony D. Barfield
(74) *Attorney, Agent, or Firm*—Oblon, Spivak, McClelland, Maier & Neustadt, P.C.

(57) ABSTRACT

The present invention provides a seat for vehicles with a lower anchor on which a child's seat is locked at a bottom of the child's seat through a connector on a back lower end of the child's seat and which is arranged in a notch on a bottom of a backrest. The lower anchor is fixed to a member which fixes the vehicle seat to a vehicle floor. As a result, the notch can be minimized to improve external appearance; the fastening of the lower anchor can be readily carried out to improve work efficiency; and cost increase and heavier weight can be avoided.

10 Claims, 6 Drawing Sheets

SEAT FOR VEHICLES

BACKGROUND OF THE INVENTION

The present invention relates to a seat for vehicles with a child's seat fixed to it. For clarification, hereinafter, the former and the latter are referred to as "vehicle seat" and "child's seat", respectively.

Conventionally, a seat belt or the like is generally used to fasten a child's seat on a vehicle seat which comprises a seat portion and a backrest rotatably connected at its lower end to a rear end of the seat portion through a reclining adjuster. This means that considerable time may require for belting on the child's seat so as not to be loosened.

FIG. 1 shows a conventional vehicle seat which is designed to improve work efficiency in fastening of a child's seat. In the figure, reference numeral 1 represents a vehicle floor; 2, a seat portion; and 3, a backrest. A lower anchor 4 on which a child's seat is locked at its back has ends welded to a mounting plate 6 formed with a hole 5 (see FIG. 2) for receiving a bolt 7. As shown in FIG. 1, the plate 6 is bolted on to the floor 1 so that the lower anchor 4 may face a notch 8 on a bottom of the backrest 3.

FIG. 3 is a perspective view of another conventional vehicle seat. A lower anchor 4 has ends welded to a backrest frame 9 in a backrest 3 so that it may face a notch 8 on a bottom of the backrest 3.

FIG. 4 is a vertical sectional view of still another conventional vehicle seat. A lower anchor 4 has ends welded to a seat frame 10 in a seat portion 2 so that it may face a notch 8 on a bottom of a backrest 3.

In any of the vehicle seats as shown in FIGS. 1, 3 and 4, the fastening of the child's seat is readily carried out by locking a portion of the child's seat on the lower anchor 4 which faces the notch 8 on the bottom of the backrest 3.

However, in the vehicle seat shown in FIGS. 1 and 2, the notch 8 must be large-sized so as to be efficiently fitted over the lower anchor 4 on the floor 1 when the vehicle seat, which is heavy and will cause much burden on an operator in assembling of a vehicle, is to be assembled into a vehicle body. This leads to poor external appearance or spoils the seat. Moreover, use of the mounting plate 6 and the bolt 7 to bolt on the plate 6 to the floor 1 causes problems such as cost increase and poor work efficiency due to increase in number of the components used. Also, there are problems of cost increase and heavier weight since some measures must be taken for reinforcement of the floor 1 to cope with the load applied on the lower anchor 4.

In each of the vehicle seats shown in FIGS. 3 and 4, the ends of the lower anchor 4 must be welded to a curved surface of the frame 9 or 10, which will lead to difficulties in carrying out the welding with higher accuracy. Moreover, in order to increase mechanical strength of the frame 9 or 10, the diameter of the frame must be increased, which will lead to problems such as cost increase and heavier weight.

The present invention was made in view of the above and has its object to minimize the notch on the bottom of the backrest so as to improve external appearance, and further, to facilitate the fixing on the lower anchor so as to increase work efficiency and avoid cost increase and heavier weight.

BRIEF SUMMARY OF THE INVENTION

The present invention provides a seat for vehicles with a lower anchor on which a child's seat is locked at a bottom thereof through a connector on a back lower end thereof and which is arranged in a notch on a bottom of a backrest, comprising said lower anchor fixed to means for fixing the vehicle seat to a vehicle floor.

With the arrangement as described above, no special measures are needed for reinforcement of the floor since the lower anchor is fixed to the means which is highly rigid because of being originally reinforced for its original purpose of fixing the vehicle seat to the floor. Moreover, the vehicle seat with the lower anchor being fixed to it is assembled into the vehicle body, so that the notch on the bottom of the backrest can be minimized and external appearance can be improved in comparison with the prior art wherein the vehicle seat is assembled into the vehicle body with lower anchor being fixed to the vehicle floor. Also, there is no need to provide a special mounting plate for a lower anchor nor to fix the mounting plate using a special bolt.

Further, the fixing such as welding of the lower anchor to the means for fixing the vehicle seat to the floor is easy to carry out since the latter means is generally flat in shape. Moreover, there is no need to increase the diameter of the seat or backrest frame so as to increase mechanical strength of the frame since the lower anchor is not fixed on the frame.

An embodiment of the invention will be described in conjunction with the attached drawings.

DETAILED DESCRIPTION OF THE PREFERRED EMBODIMENTS

Figure 1:
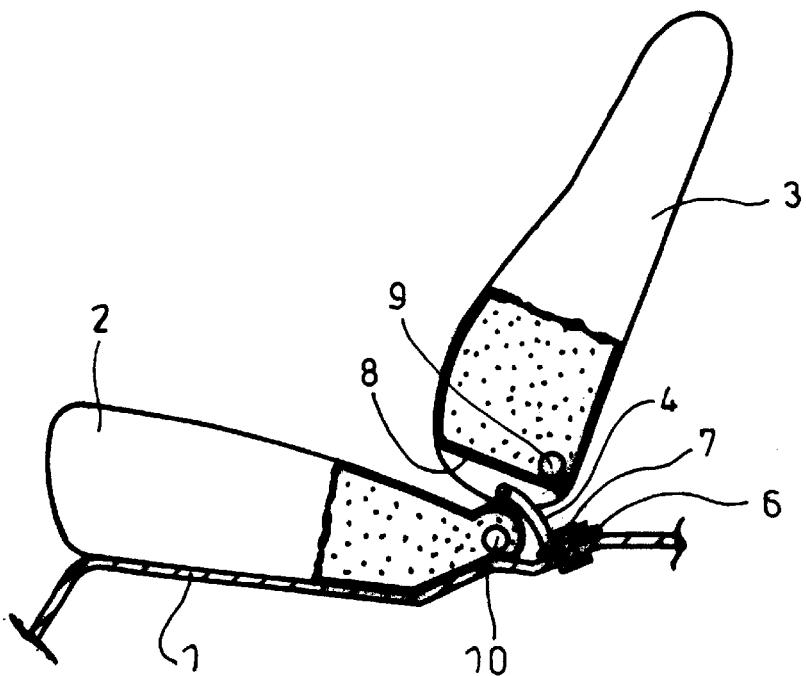
FIG. 1 is a vertical sectional view of a conventional vehicle seat.
Figure 2:
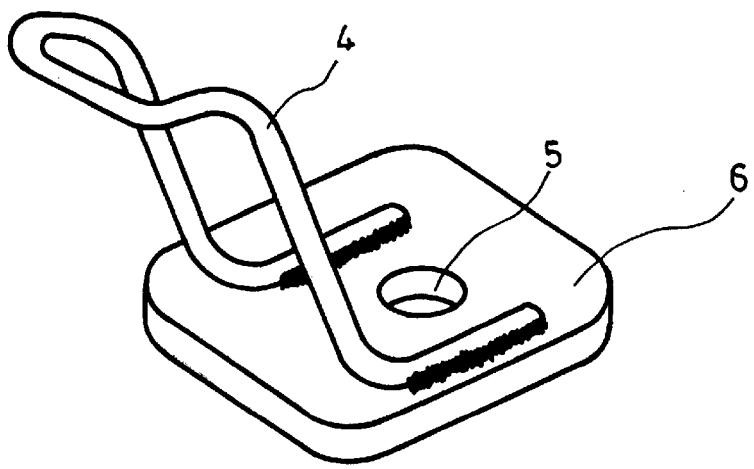
FIG. 2 is an enlarged perspective view of a lower anchor used for the vehicle seat of FIG. 1.
Figure 3:
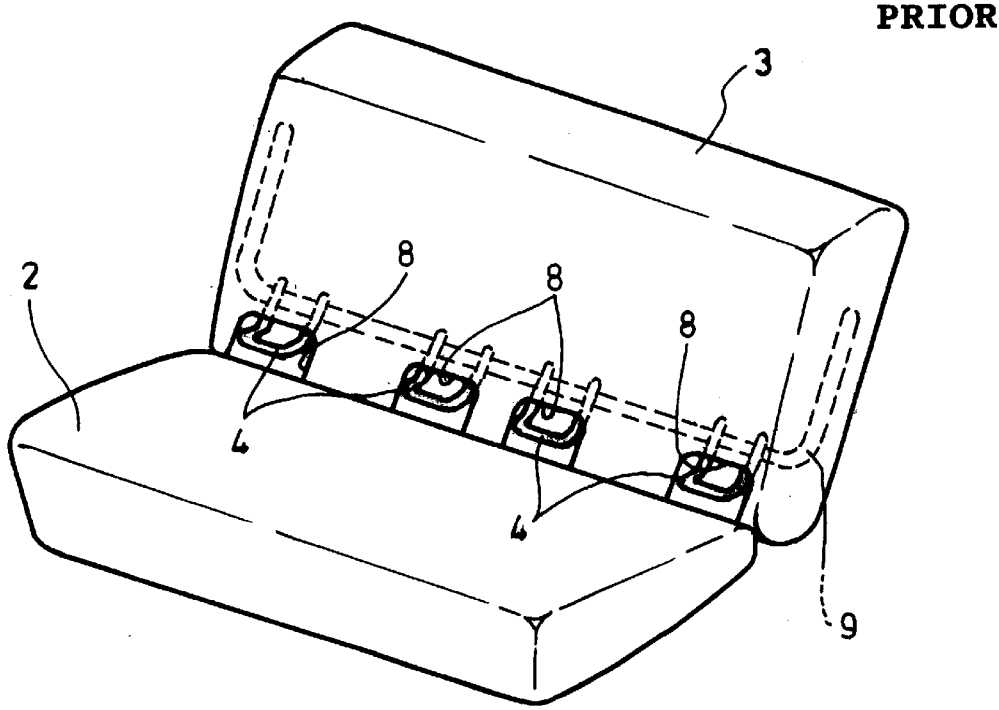
FIG. 3 is a perspective view of another conventional vehicle seat.
Figure 4:
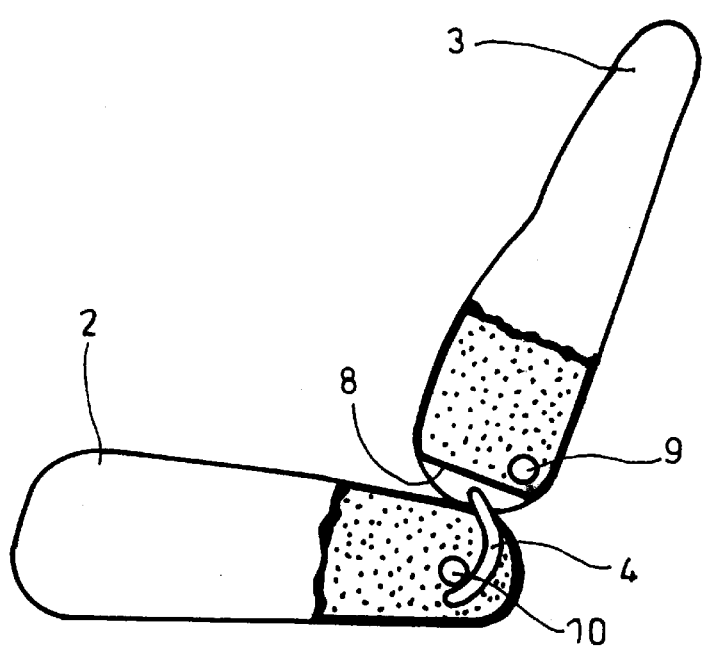
FIG. 4 is a vertical sectional view of still another conventional vehicle seat.
Figure 5:
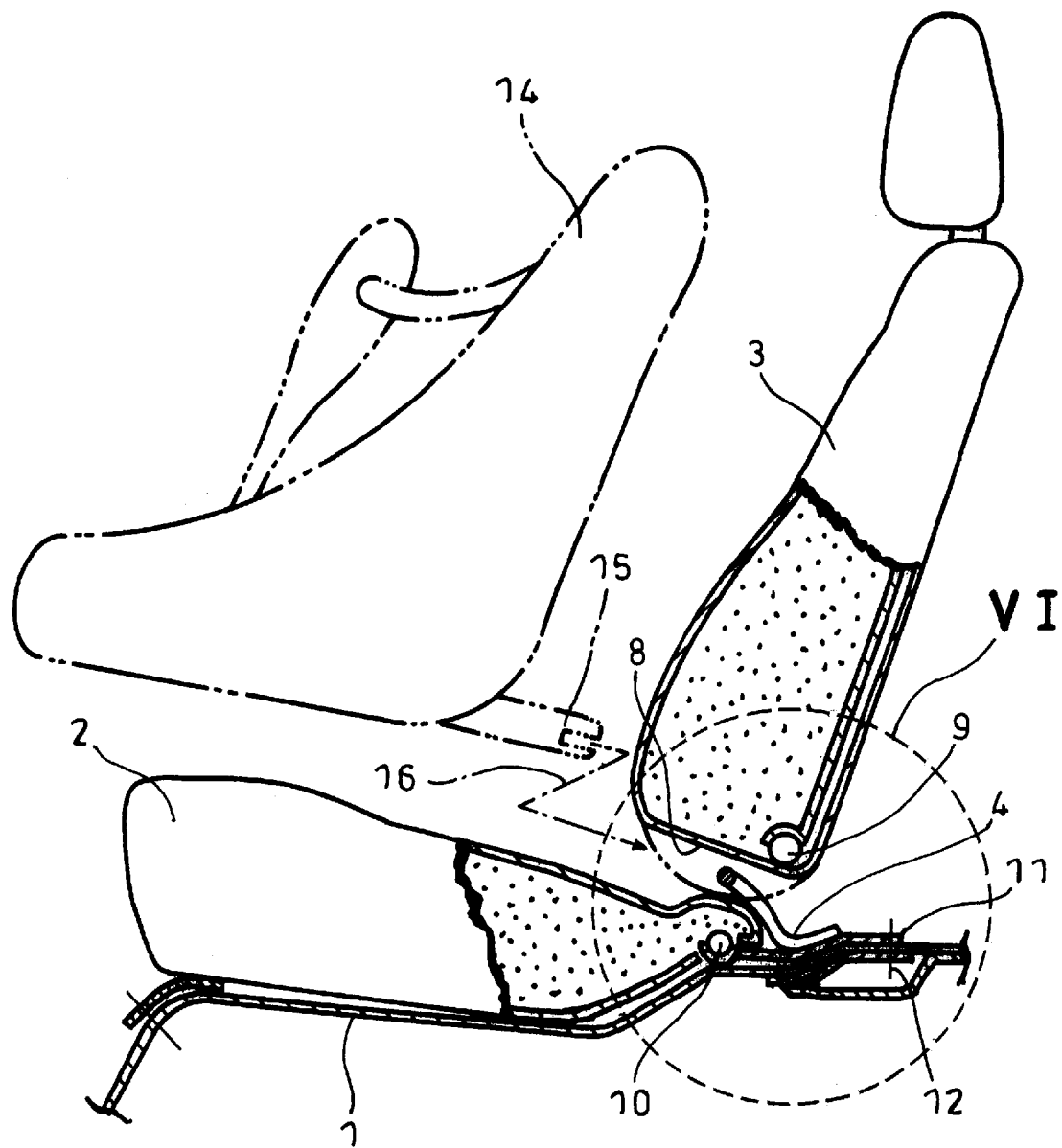
FIG. 5 is a partially cutaway side view of an embodiment of the invention.
Figure 6:
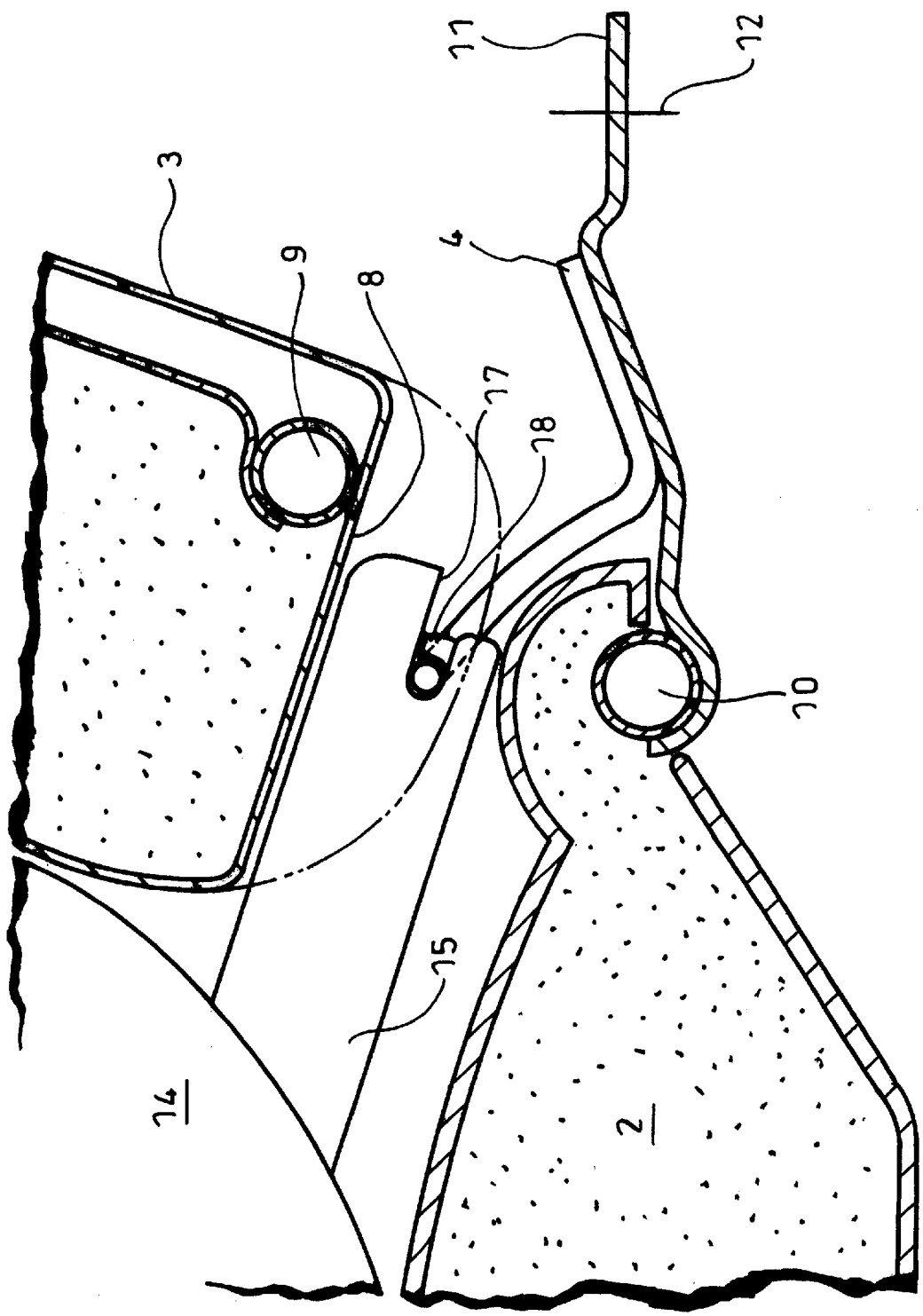
FIG. 6 is an enlarged view of a portion shown by VI in FIG. 5, when the portion is being used.
Figure 9:
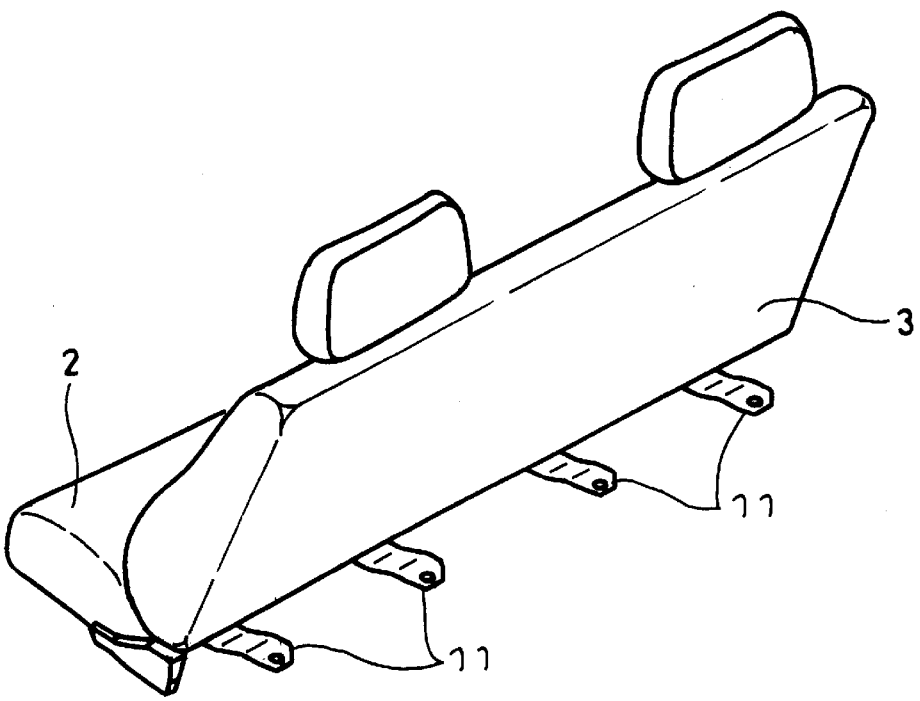
FIG. 9 is a perspective view of the seat of FIG. 5 as seen from rear.

As shown in FIGS. 5 and 6, a seat portion 2 has at its lower surface a seat frame 10 as in the conventional seats. A plurality of seat legs 11 (or members to fix the vehicle seat to the floor 1; See FIG. 9), each having a front end fixed to the seat frame 10 by for example welding, protrude backward from the seat portion 2. Each of the seat legs 11 has a rear end fixed to a floor 1 by a lock bolt 12 so that the vehicle seat as a whole is mounted on the floor 1.

Figure 7:
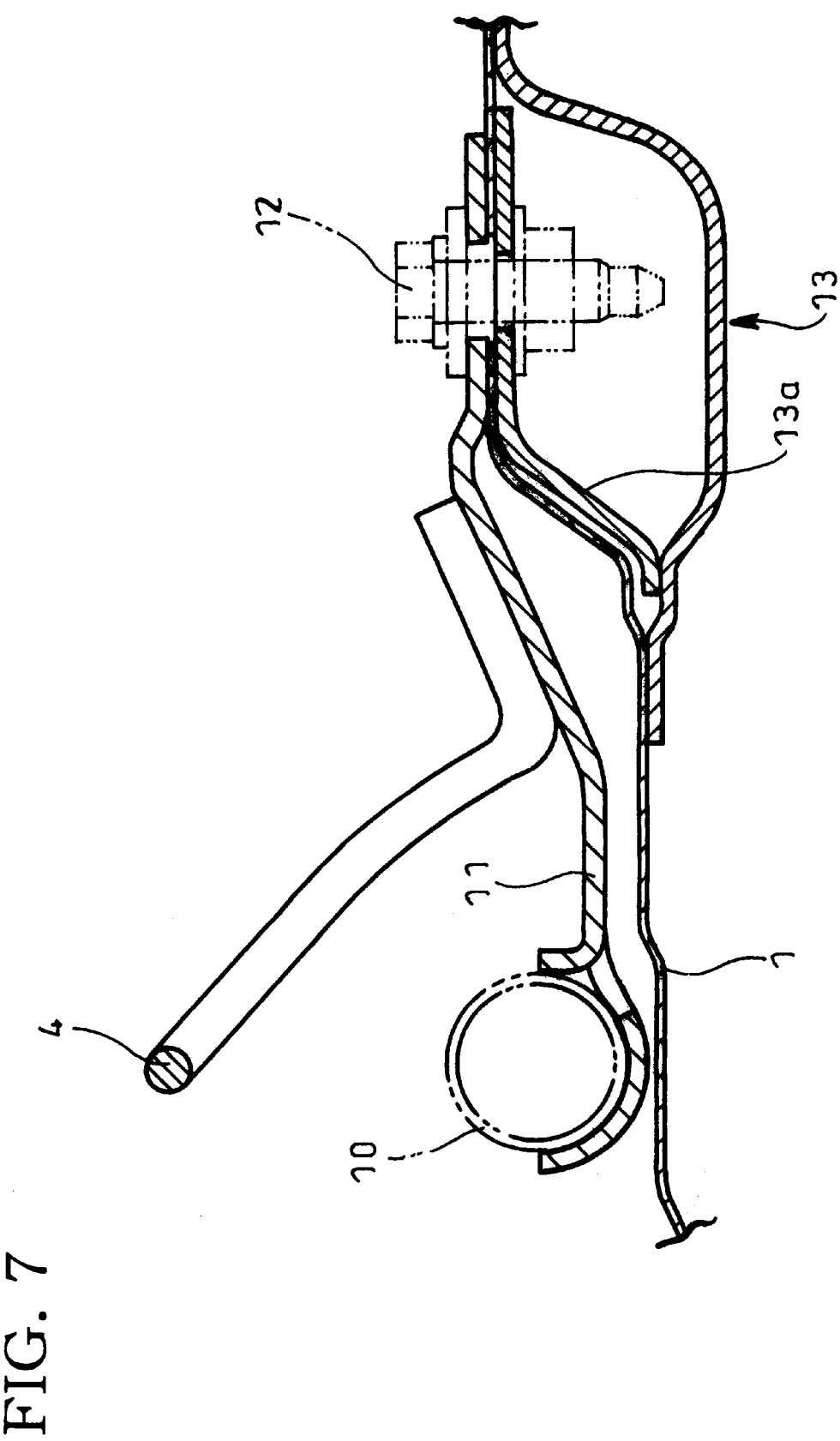
FIG. 7 is a sectional view showing a condition where the seat leg shown in FIG. 6 is mounted.

As shown in FIG. 7, the portion of the floor 1 to which the rear end of the seat leg 11 is fixed has been originally reinforced by a box-shaped floor reinforcement member 13 extending laterally of the vehicle and a bracket 13a on the fixture portion so as to have sufficient strength to endure any load to be applied on the vehicle seat.

Figure 8:
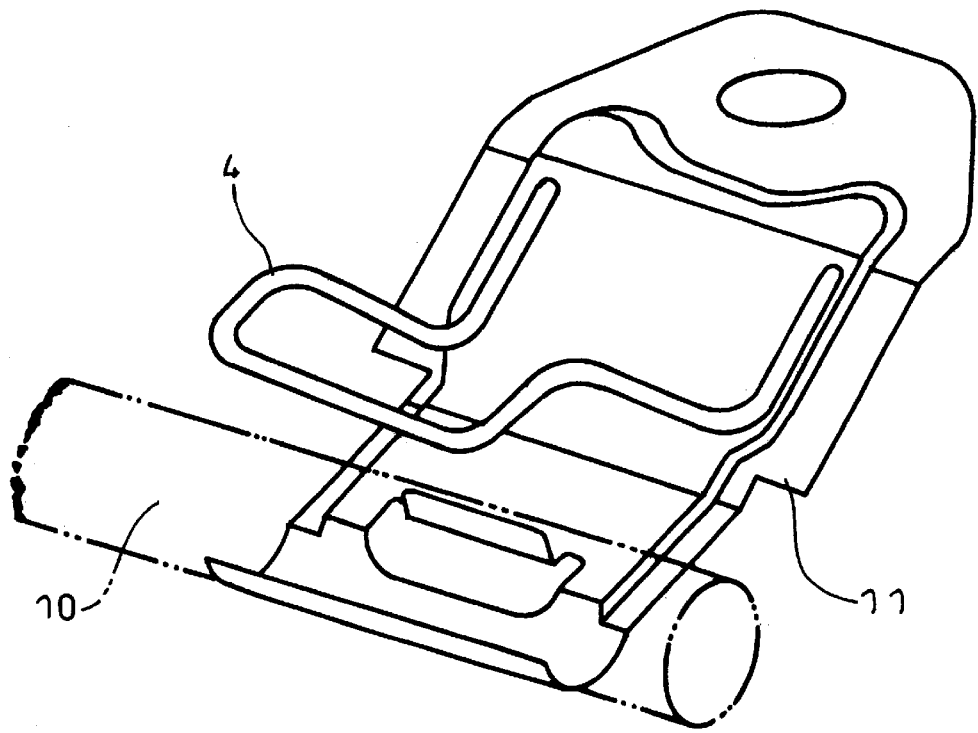
FIG. 8 is a perspective view of the seat leg and the lower anchor shown in FIG. 7.

A lower anchor 4 is welded at its rear ends to an upper surface of the seat leg 11 as shown in FIGS. 5 and 8 so that the lower anchor 4 faces at its front end to a notch 8 on a bottom of the backrest 3 as shown in FIGS. 5 and 6.

Here, in use of the lower anchor 4 fixed to the seat leg 11, a connector 15 at a back lower end of a child's seat 14 is inserted into the notch 8 on the bottom of the backrest 3 as shown at 16 in FIG. 5 so that a groove 17 on a rear end of the connector 15 is fitted over the forward end of the lower anchor 4 as shown in FIG. 6 and a lock piece 18 urged to project into the groove 17 is engaged with the forward end of the lower anchor 4 into a locked state. As a result, the child's seat 14 (See FIG. 5.) is fixed at its bottom on the floor 1 as well as on the vehicle seat via the connector 15, lower anchor 4 and seat leg 11.

When the child's seat 14 is to be removed from the vehicle seat, an unlocking mechanism (not shown) of the child's seat is operated to move the lock piece 18 back into an inoperative position and the connector 15 is withdrawn from the lower anchor 4.

In the arrangement as described above, no special measures are needed for reinforcement of the floor 1 since the lower anchor 4 is fixed to the seat leg 11 which is highly rigid because of being originally reinforced for its original purpose of fixing the vehicle seat to the floor 1. Moreover, the vehicle seat with the lower anchor 4 being fixed to it is assembled into the vehicle body, so that the notch 8 on the bottom of the backrest 3 can be minimized and external appearance can be improved in comparison with the prior art wherein the vehicle seat is assembled into the vehicle body with the lower anchor 4 being fixed to the floor 1. Also, there is no need to provide a special mounting plate for the lower anchor 4 nor to bolt on the mounting plate to the floor 1 using a special bolt.

The seat leg 11 for fixture of the seat to the floor 1 is a flat member, which facilitates the fixing of the lower anchor 4 to the member by for example welding. There is no need to increase frame diameter so as to increase mechanical strength of the backrest or seat frame 9 or 10 since the lower anchor 4 is not fixed to the frame 9 or 10.

Therefore, according to the above embodiment, the size of the notch 8 on the bottom of the backrest 3 can be minimized and external appearance can be improved. Further, there is no need to provide a special mounting plate for the lower anchor 4 nor to fix the mounting plate using a special bolt and no special measures are needed for reinforcement of the floor 1; as a result, avoided are increase in cost and heavier weight due to increase in number of components as well as increase in cost and heavier weight due to measures for reinforcement of the floor 1. The lower anchor 4 can be welded at higher accuracy to and can be easily fixed to the flat portion of the seat leg 11. Further, there is no need to increase the mechanical strength of the backrest or seat frame 9 or 10, which will lead to avoid increase in cost and heavier weight due to use of pipe with larger diameter.

It is to be understood that the seat for vehicles according to the invention is not limited to the above embodiment and that various changes and modifications may be made without departing from the spirit and the scope of the invention. In the embodiment shown, utilized is the seat leg as means for fixing the seat to the floor; however, in a case where the seat has a position adjustment mechanism which comprises a pair of rails fixed to a bottom of the seat and a floor of the vehicle, respectively, the former rail being slidable along the latter rail, the lower anchor may be fixed to the mounting member which fix the rail to the floor.

What is claimed is:

1. A seat for a vehicle with a backrest and a seat cushion, comprising:

at least one seat leg configured to fix said seat for a vehicle on a floor of the vehicle, said at least one seat leg extending rearwardly of the seat cushion; and at least one U-shaped lower anchor configured to anchor a connector of a child seat and fixed to said at least one seat leg at two end portions of said at least one U-shaped lower anchor extending rearwardly with respect to the seat cushion, said at least one U-shaped lower anchor having an intermediate portion extending forwardly with respect to the seat cushion in a notch at a lower end portion of the backrest.

2. The seat for a vehicle according to claim 1, wherein said two end portions of said at least one U-shaped lower anchor are configured to conform to said at least one seat leg for attachment.

3. The seat for a vehicle according to claim 1, wherein:

said at least one seat leg includes an attachment portion for said two end portions of said at least one U-shaped lower anchor; and said two end portions of said at least one U-shaped lower anchor are configured to conform to said attachment portion for attachment.

4. The seat for a vehicle according to claim 1, wherein said two end portions of said at least one U-shaped lower anchor are welded to said at least one seat leg.

5. A seat for a vehicle with a backrest and a seat cushion, comprising:

a plurality of seat legs configured to fix said seat for a vehicle on a floor of the vehicle, said plurality of seat legs extending rearwardly of the seat cushion; and a plurality of U-shaped lower anchors each configured to anchor a connector of a child seat and fixed to a respective one of said plurality of seat legs at two ends of each of said plurality of U-shaped lower anchors extending rearwardly with respect to the seat cushion, said plurality of U-shaped lower anchors each having an intermediate portion extending forwardly with respect to the seat cushion in a respective notch at a lower end portion of the backrest.

6. The seat for a vehicle according to claim 5, wherein said two end portions of each of said plurality of U-shaped lower anchors are configured to conform to said plurality of seat legs for attachment, respectively.

7. The seat for a vehicle according to claim 5, wherein:

said plurality of seat legs each includes an attachment portion for said two end portions of each of said plurality of U-shaped lower anchors; and said two end portions of each of said plurality of U-shaped lower anchors are configured to conform to said attachment portion for attachment, respectively.

8. The seat for a vehicle according to claim 5, wherein said two end portions of each of said plurality of U-shaped lower anchors are welded to a respective one of said plurality of seat legs.

9. A seat for a vehicle with a backrest and a seat cushion, comprising:

at least one fixing means for directly fixing said seat for a vehicle on a floor of the vehicle, said at least one fixing means extending rearwardly and outwardly of the seat cushion; and at least one anchoring means for anchoring a child seat on the seat for a vehicle and fixed to said at least one fixing means, said at least one anchoring means extending rearwardly with respect to the seat cushion, said at least one anchoring means having an intermediate portion extending forwardly with respect to the seat cushion in a notch at a lower end portion of the backrest.

10. The seat for a vehicle according to claim 9, wherein said at least one anchoring means are welded to said at least one fixing means.

* * * * *